May 24, 1949.  D. KREMKO ET AL  2,470,994
FLAG POLE PAINTING APPARATUS

Filed June 1, 1946  3 Sheets-Sheet 1

INVENTORS
Daniel Kremko &
BY Joseph Podufaly
Louis Chayka
ATTORNEY

May 24, 1949.  D. KREMKO ET AL  2,470,994

FLAG POLE PAINTING APPARATUS

Filed June 1, 1946  3 Sheets-Sheet 2

INVENTORS
Daniel Kremko &
BY Joseph Podufaly
Louis Chayka
ATTORNEY

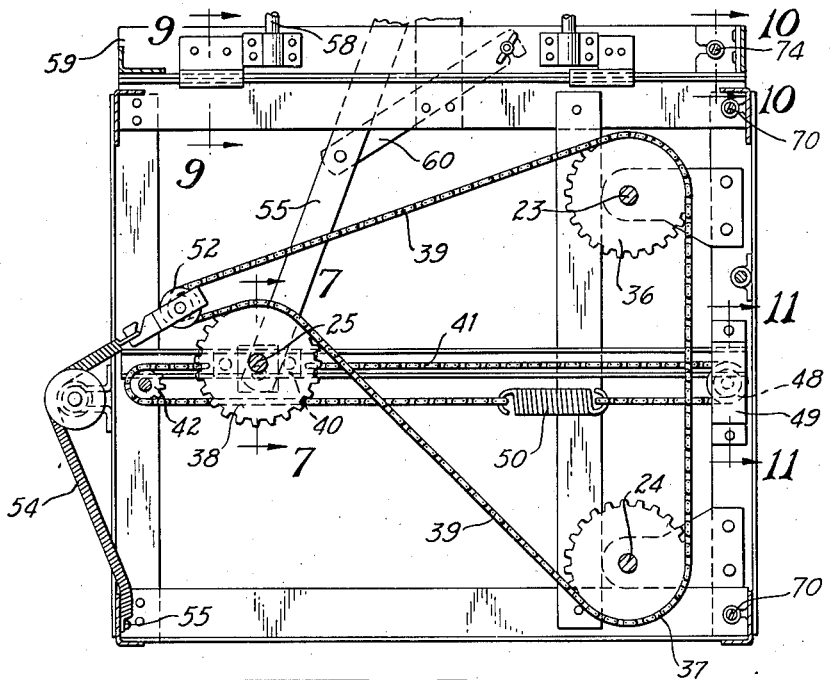
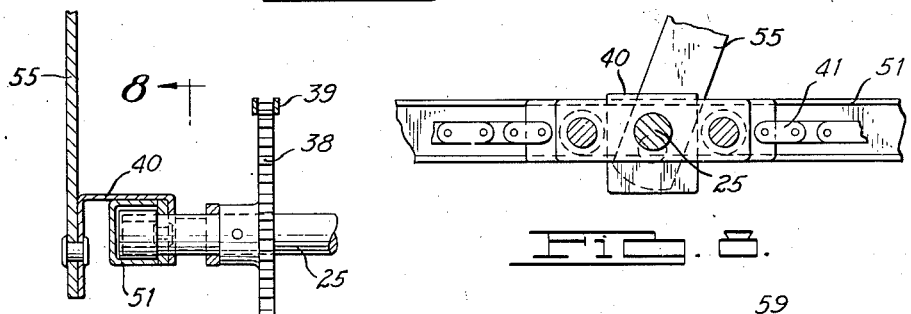
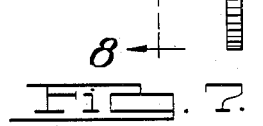
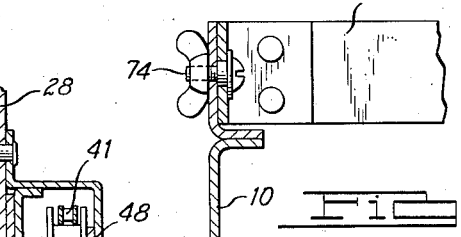
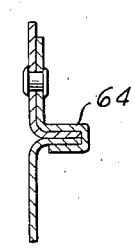
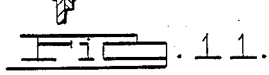
INVENTORS
Daniel Kremko &
Joseph Podufaly
BY Louis Chayka
ATTORNEY Patented May 24, 1949

2,470,994

UNITED STATES PATENT OFFICE 2,470,994

FLAG POLE PAINTING APPARATUS

Daniel Kremko and Joseph Podufaly,
Detroit, Mich.

Application June 1, 1946, Serial No. 673,771

6 Claims. (Cl. 91—45)

It is a known fact that painting flag poles is a troublesome and a difficult problem to accomplish, which often involves a great risk of personal injury. In order, therefore, to make this task easy and simple and to obviate any risk to the person assuming the task, we have devised our machine by means of which the painting may be done safely by an operator standing on the ground at the base of the pole.

In meeting the problem, it was our task to make the machine practical, light and comparatively inexpensive.

We shall now describe our machine with reference to the accompanying drawings, in which:

Fig. 6 is a sectional view on line 6—6 of Fig. 4;

Fig. 7 is a sectional view of a detail on line 7—7 of Fig. 6;

Fig. 8 is a sectional view on line 8—8 of Fig. 7;

Fig. 9 is a sectional view on line 9—9 of Fig. 6;

Fig. 10 is a sectional view on line 10—10 of of Fig. 6;

Fig. 11 is a sectional view on line 11—11 of Fig. 6.

Similar numerals refer to similar parts throughout the several views.

Figures 1, 2:
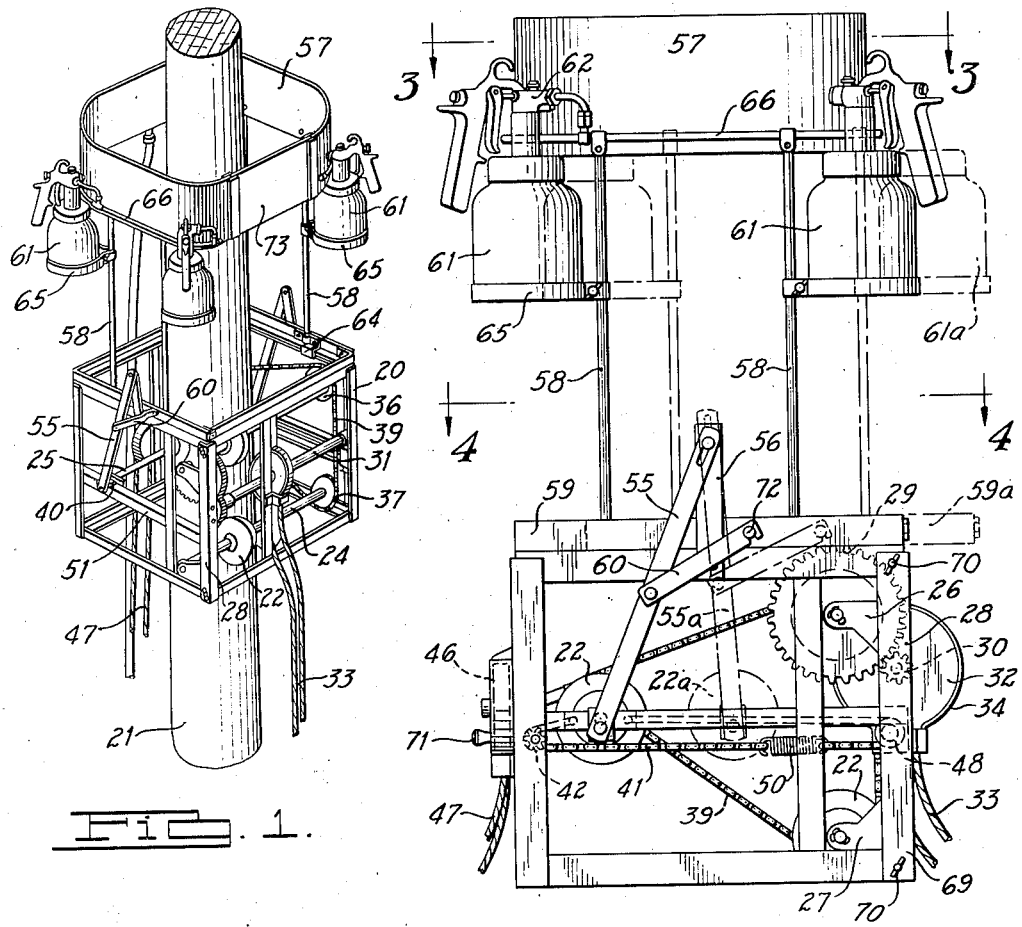
Fig. 1 is a perspective view of our machine in its operative position upon a flag pole which is to be painted.
Fig. 2 is an enlarged side elevational view of the machine.

The machine is a combination of paint sprayers and a cage to raise the sprayers along a flag pole to the top thereof and to lower it gradually as the process of painting progresses from the top downwardly.

The cage, indicated generally by numeral 20, is rectangular in shape, being open at top and at bottom to accommodate a flag pole 21 which, during the operation of the machine, occupies the center of the cage. Disposed within the cage are three sets of rollers 22. The rollers come in pairs, each pair being mounted on the same shaft. The individual rollers are semi-spherical in shape, and in each pair are opposed in such a manner that the spherical surfaces are turned towards each other, one being spaced from the other. Two pairs of these rollers are mounted on shafts 23 and 24 respectively, one shaft 23 being at the upper part of the cage and the other shaft 24 being directly below in the lower part of said cage, while the remaining pair of rollers is mounted on a shaft 25, which is in a yieldably spaced relation to the aforementioned shafts 23 and 24. The purpose is to have two sets of rollers one above the other on one side of the pole, and one set of the rollers on the other side but at a level mid-way the levels of shafts 23 and 24. The last named shafts are journalled in stationary brackets 26 and 27 respectively, said brackets projecting from corner angle members 28, forming a part of cage 20.

Mounted on the upper shaft 23 is a geared wheel 29. The latter is in mesh with a pinion 30 mounted on shaft 31, which supports a pulley 32. The pulley may be operated by means of a rope 33, which reaches to the ground. A metal guard 34 skirts the pulley, the free ends of the guard being retained in an enclosure 35, the bottom of which contains apertures for passage of said rope. Shaft 31 is journalled in bearings affixed to said angle members 28. It will be understood that the rotation of pulley 32 will cause the rotation of rollers 22 on the upper shaft 23.

For the purpose of our machine, it is desirable that all rollers rotate in unison. For this reason, each of the shafts which supports rollers is provided with a sprocket wheel, as best disclosed in Fig. 6, wherein numerals 36 and 37 indicate sprocket wheels on shafts 23 and 24 respectively, while numeral 38 indicates a sprocket wheel on shaft 25. A sprocket chain 39 engages all the three wheels, which are all of the same diameter so that the rotation of one, namely that on shaft 23, will cause the other wheels to rotate in unison therewith. The rollers are thus in a frictional contact with the flag pole from opposite sides, and when the shafts are made to rotate, this causes the whole cage 20 to move vertically along the surface of the pole upwardly or downwardly as the case may be, according to the direction of the rotation of the rollers.

In view of the fact that the diameter of each flag pole decreases progressively towards the top portion thereof, means had to be devised for adjusting the spacing between the shafts supporting the rollers on the opposite sides of the pole. With a view thereto, shaft 25 is journalled in a pair of brackets 40, slidingly seated on horizontal rails 51, and a chain drive is provided on each end of the shaft to move it towards or away from shafts 23 and 24. The chains 41, being a part of the mechanism, are also of a sprocket type. Each chain is engaged by a sprocket wheel 42 on shaft 43, journalled in the framework of the cage, and is driven by means of a gear wheel 44 rotated by means of a worm 45. The latter in turn is operated by means of a pulley 46 actuated by means of another rope 47 extending to the ground. Chain 41 forms a closed loop including the sliding brackets 40, and being driven by said sprocket wheel 42 at one end of the loop, slides over a roller 48 at the other end of the loop. The roller is held in a housing 49 affixed to the frame of cage 20, as shown in Fig. 6. To impart the necessary tension to the chain, it also includes a length of a coiled spring 50. To keep taut, sprocket chain 39 engaging sprocket wheels 36, 37 and 38, respectively, the chain is made to pass over an auxiliary sheave 52 disposed within a forked holder 53, which is hooked at one end to a length of a coiled spring 54. The spring is anchored at the base of cage 20 at 55. Thus the chain 39 engaging the three sprocket wheels, passes over the sheave and, irrespective of the shifting position of sprocket wheel 38 on shaft 25, is always kept under tension by said spring 54. To prevent the sliding brackets 40 from leaving rails 51, the machine includes braces 55. Each brace is pivotally connected at one end to the sliding brackets 40 and at the other end also pivotally is affixed to an upright bar 56. The braces have also another function in connection with a complementary part of our machine, which will be described hereinbelow.

Said complementary part includes a shield made of a wide strip of sheet metal formed substantially into a quadrangle. The shield is supported on a frame 59 by means of four rods 58, said frame resting on top of cage 20 but being adapted to be shifted laterally to a position 59a shown in dotted lines, and carrying with it said rods and said shield. On one side the frame has a removable member which is held in place by nuts 74. Arms 60, pivotally affixed to braces 55, as best shown in Fig. 2, keep frame 59 in its position on top of said cage 20. Attached to each rod by means of an encircling band 65 is a paint container 61, each of said containers being equipped with a pneumatic sprayer 62 in such a manner that the nozzle 63 of each sprayer is placed within an aperture in the shield and is turned inwardly towards the center of the area enclosed thereby.

Figure 3:
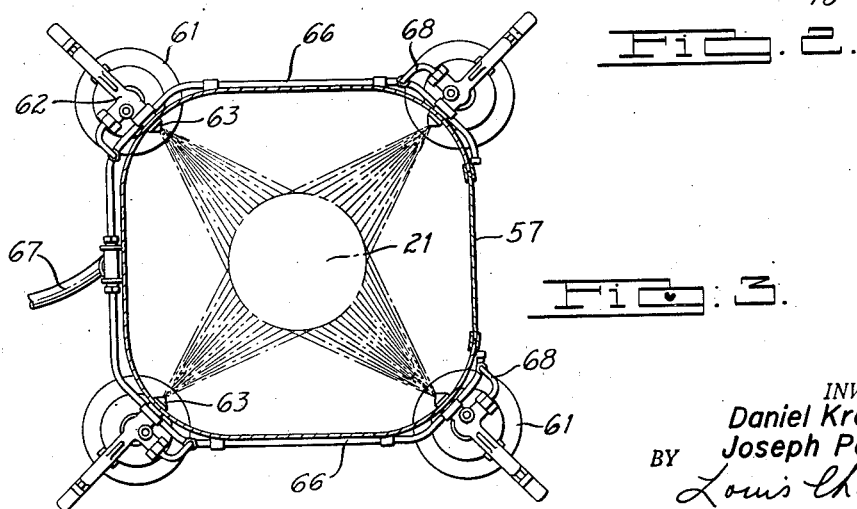
Fig. 3 is a sectional view on line 3—3 of Fig. 2.
Figure 4:
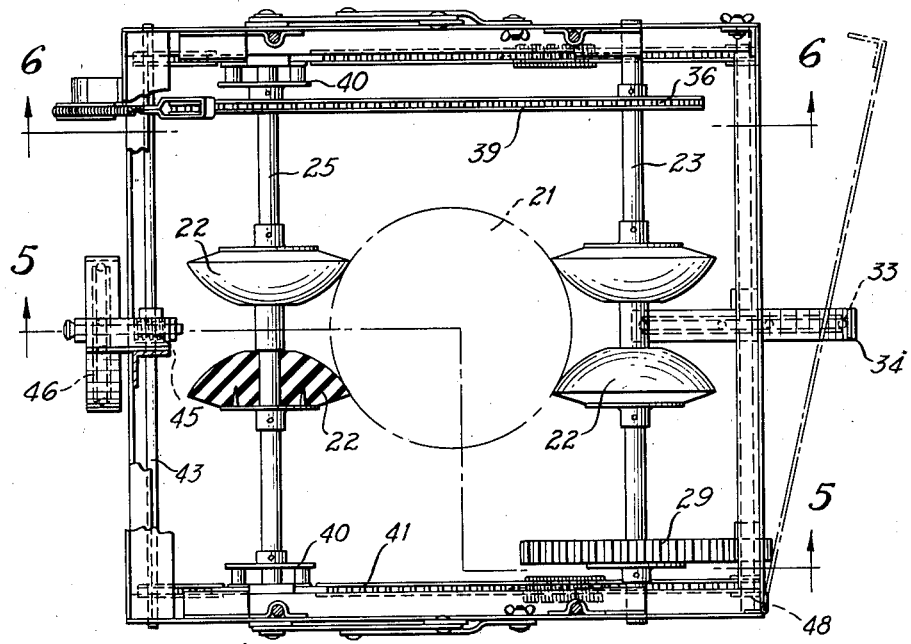
Fig. 4 is a horizontal sectional view of the machine on line 4—4 of Fig. 2.
Figure 5:
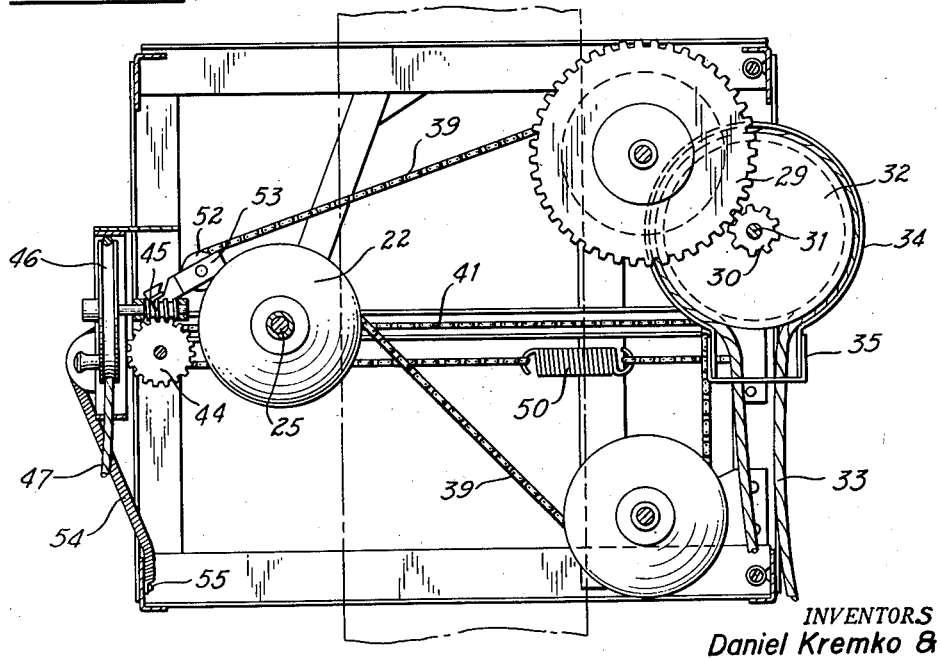
Fig. 5 is a vertical sectional view on line 5—5 of Fig. 4.

The four sprayers, which are shown in the drawings, are equally spaced from each other, being mounted at the corners of the shield as shown in Fig. 3. A metal pipe 66 disposed along the lower edge of shield 57, is connected to a flexible rubber tube 67 extending down to the ground in order that air under pressure from a suitable source may be brought into said pipe 66 and therefrom applied by means of nipples 68 to individual sprayers.

Now we shall describe the manner of operating our machine. When the machine is to be used for painting a flag pole, one side of cage 20, indicated by numeral 69, may be removed. The side is normally kept in place by means of thumb screw 70. With the removable side go two sets of rollers 22 on shafts 23 and 24 respectively. Preliminary to the removal of the side, it will be necessary to slip off the sprocket chain 39 of sprocket wheels 36 and 37. This may be done easily, owing to the manner in which the chain is kept under tension by spring 54. The other sprocket chain 41 may be disconnected by slipping it off the hooked end of spring 50.

We have already indicated above that one side of frame 59 is also removable, and so is a gate 73 in shield 57. This done, the cage is shifted to a position where the flag pole will be in its center, whereupon the removable sides of the cage and the frame, also the gate 73, may be replaced and the sprocket chains are again brought to their normally operative position, as described above. Next, by means of a hand crank 71 on pulley 46, the worm and gear mechanism 45 and 44 respectively, is brought into play to propel by means of chain 41 the movable shaft 25 with its rollers 22, till the rollers are in a frictional contact with the surface of the flag pole from one side, while the rollers on shafts 23 and 24 are in a frictional contact with said pole from the opposite side. The whole cage may now be manually lifted as far as it may be conveniently done from the ground. From then on the cage is made to rise upwardly by means of the rollers on stationary shafts 23 and 24, responsive to the rotation of pulley 32 actuated by rope 33. As the cage rises and the diameter of the pole decreases, the movable shaft is brought closer to the stationary shafts by a pull on the rope, operating by intermediate means already described, the movement of sprocket chain 41, which is connected to sliding brackets, supporting the movable shaft 25. The rollers on said shaft and the rollers on the stationary shafts are thus brought closer to each other to tighten their frictional grip on the pole. This is continued till the cage has reached the top of the pole.

It will be assumed that the containers 61 are filled with paint and that the sprayers are properly connected to receive compressed air through tube 67 from the ground. All that will be necessary to start the painting is to turn on the valve to supply air to the sprayers, which will deliver a spray of paint against the pole from all directions. Now, by means of the height controlling pulley 32, actuated by rope 33, the cage may be lowered sufficiently till the sprayers are in a position to spray another length of the pole. The air valve may or not be open during that time, according to the choice of the operator. This, of course, may be continued till the cage has reached the lower portion of the pole close to the ground where it may be taken off.

As was indicated above, shaft 25 is movable so that rollers 22 on said shaft may be always in a frictional contact with the flag pole, even though the diameter grows progressively smaller or larger, depending on the direction of the vertical movement of the cage. As a result thereof, at the top of the pole where the diameter is small, the whole cage is shifted to one side so that the pole is no more in the center of the cage but to one side of it. The position of the movable rollers in such a case with respect to the pole is indicated by dotted lines 22a in Fig. 2. Brace 55 is indicated in its new position in dotted lines 55a. Were the shield 57 with the sprayers to remain in a stationary position on cage 20, two of the sprayers would be very close to the pole and two would be moved away from it so that the operating could not be evenly effected. For this reason, frame 59 moves correspondingly with the movable shaft 25, this being accomplished by arms 60 extending from frame 59 to brace 55. The new shifted position of the frame with the sprayers above is shown in dotted lines 59a. The new position of the sprayers is shown by numeral 61a.

As a result of this construction, the pole is always located in the central position within the shield at equal distance from all the sprayers.

It will be understood that some changes may be made in the construction of our machine without departing from the inventive principle disclosed herein. What we, therefore, wish to claim is as follows.

We claim:

1. A flag pole painting machine of the kind described, said machine including a cage having a set of rollers in stationary brackets and frictionally abutting a pole from one side, and a set of rollers on a movable shaft and frictionally abutting the pole from the other side, means to rotate the rollers in unison by a cable operable from the ground to vary the vertical position of the cage with respect to the pole, a frame slidingly seated on top of the cage, a plurality of paint sprayers mounted on the frame, and directed towards the pole, pivoted arms connecting the frame to the movable shaft and means operable by a cable from the ground to shift with respect to the cage both the movable shaft with the rollers thereon into a frictional engagement with the pole and the frame with the sprayers to maintain the pole in central position with relation to the sprayers, and pneumatic means controlled from the ground to operate the sprayers.

2. A machine of the kind described, including a plurality of rollers on stationary supporting means to frictionally engage a flag pole from one side, a plurality of rollers on movable supporting means to frictionally engage the pole from the opposite side, cable means operable from the ground to rotate the rollers to vary the vertical position of the cage with respect to the pole, cable means operable from the ground to shift the position of the movable rollers with respect to the pole to maintain a constant frictional engagement therewith, a laterally sliding frame on top of the cage, a plurality of spaced sprayers mounted on the frame in equidistant relation to the pole, connecting arms between the movable rollers and the sliding frame to move said frame in unison with the movement of the rollers laterally with respect to the pole, to maintain all sprayers equidistant from the pole irrespective of the variation of the diameter of the pole, and pneumatic means controlled from the ground to operate the sprayers.

3. A machine of the kind described to fit around a flag pole to be sprayed with paint, the machine including a cage, a set of rollers mounted therein for frictional engagement with one side of the pole, and a set of rollers on movable shaft supporting means to engage the pole from the opposite side, cable means operable from the ground to actuate the rollers to move the cage vertically along the pole, sprocket chain means to keep the rollers rotating in unison, cable means operable from the ground to keep the rollers on the movable shaft supporting means in a frictional engagement with the pole irrespective of its tapering diameter, a laterally slidable frame on top of the cage, a shield on the frame in which shield the pole occupies central position, a plurality of paint sprayers mounted on the shield, and directed towards the pole, arms connecting the movable shaft supporting means with the frame, to shift the shield laterally every time the rollers are shifted, to maintain the central position of the pole within the shield irrespective of the tapering diameter of the pole, and pneumatic means operable from the ground to operate said sprayers.

4. A painting machine for vertical operation on a flag pole, said machine comprising a cage having a plurality of rollers on shafts supported in stationary bearings for frictional engagement with a flag pole from one side, a set of rollers on a shaft mounted in bearings movable laterally with respect to the pole for frictional engagement from the diametrically opposite side, chain and sprocket means operable by pulley and cable means to rotate the rollers while in said frictional engagement with the pole, to move said cage vertically, pulley and cable means to adjust the position of the movable shaft and rollers thereon to the variation of the diameter of the pole as the cage moves vertically along said pole.

5. A flag-pole painting machine for vertical operation on a flag pole, said machine comprising a cage having a plurality of rollers and shafts supported in stationary bearings for frictional engagement with a flag pole from one side, a set of rollers on a shaft mounted in bearings movable laterally with respect to the pole for frictional engagement from the diametrically opposite side, chain and sprocket means operable by pulley and cable means to rotate the rollers while in said frictional engagement with the pole, to move said cage vertically, a frame slidingly seated on the top of the cage for lateral movement thereon, a plurality of paint sprayers mounted on the frame and directed towards the poles from different directions, pivoted arms connecting the frame, by intermediate means, to the shaft, and means operable by pulley and cable means from the ground, to shift with respect to the cage both the movable shaft, with the rollers thereon, for frictional engagement with the pole and the frame with the sprayers for adjustment of the position of the frame with respect to the axis of the pole, and pneumatic means controlled from the ground to operate the sprayers.

6. A painting machine of the kind described for vertical operation on a pole, said machine comprising a cage, two sets of rollers, one above the other, both sets on stationary shafts mounted within the cage for frictional engagement with one side of the pole, a single set of rollers at mid-level between the two sets for frictional engagement with the pole from the opposite side, the single set being mounted on a shaft mounted within a pivoted brace means, chain and sprocket means to secure the rotation of all the rollers in unison, cable and pulley means to operate the chain and sprocket means from the ground to effect vertical movement of the cage by means of said rollers being in a frictional engagement with the sides of the pole, pulley and cable means acting by intermediate means upon the single set of rollers to adjust the spacing between said set of rollers and the rollers on the stationary shafts for continuous frictional engagement of the rollers from both sides against the pole irrespective of the variation of the diameters thereof, spring tensioning device for the sprocket and chain irrespective of the changing position of the shaft with the single set of rollers, a frame slidingly seated on top of the cage, for a lateral movement thereon, a plurality of paint sprayers mounted on the frame and directed towards the pole from different directions, pivoted arms connecting the frame with means supporting the movable shaft, and means operable by a cable from the ground, to shift, with respect to the cage, both the shaft with said rollers and the frame with the sprayers for adjustment of said rollers and of the frame with respect to the axis of the pole, and pneumatic means controlled from the ground to operate the sprayers.

DANIEL KREMKO.
JOSEPH PODUFALY.

REFERENCES CITED

The following references are of record in the file of this patent:

UNITED STATES PATENTS

| Number | Name | Date |
|---|---|---|
| 1,829,831 | Hiskey | Nov. 3, 1931 |
| 1,960,725 | Bramsen et al. | May 29, 1934 |
| 2,030,840 | Allen | Feb. 18, 1936 |
| 2,370,254 | Michelson | Feb. 27, 1945 |